United States Patent [19]
Diers

[11] Patent Number: 5,427,948
[45] Date of Patent: Jun. 27, 1995

[54] APPARATUS FOR CONDUCTING HYBRIDIZATION

[75] Inventor: Brian Diers, East Lansing, Mich.

[73] Assignee: Michigan State University, East Lansing, Mich.

[21] Appl. No.: 99,176

[22] Filed: Jul. 29, 1993

[51] Int. Cl.$^6$ .................................. C12M 1/10
[52] U.S. Cl. ...................... 435/312; 435/316; 422/104; 422/209; 935/85
[58] Field of Search ......... 435/6, 287, 288, 296, 435/299, 310, 311, 312, 316, 809; 422/99, 101, 104, 209, 292, 300, 136; 34/104; 118/730, 55, 409, 410, 418; 134/153, 154, 158, 159; 204/212, 213; 210/321.63, 398; 366/241, 273; 935/85, 88

[56] References Cited

U.S. PATENT DOCUMENTS

| | | | |
|---|---|---|---|
| 2,952,588 | 9/1960 | Rinderer | 435/312 |
| 3,695,162 | 10/1972 | Wing | 134/159 |
| 3,839,155 | 10/1974 | McAleer et al. | |
| 3,925,165 | 12/1975 | Muller . | |
| 3,938,171 | 2/1976 | Masygan | 354/299 |
| 4,208,483 | 6/1980 | Lee | 435/284 |
| 4,343,904 | 8/1982 | Birch et al. | 435/285 |
| 4,377,639 | 3/1983 | Lee | 435/285 |
| 4,536,092 | 8/1985 | Kedem | 366/265 |
| 4,650,766 | 3/1987 | Harm et al. | 435/284 |
| 4,908,319 | 3/1990 | Smyczek et al. | 435/285 |
| 5,015,585 | 5/1991 | Robinson | 435/285 |
| 5,104,808 | 4/1992 | Laska et al. | 435/288 |
| 5,126,269 | 6/1992 | Fike et al. | 435/284 |

FOREIGN PATENT DOCUMENTS

| | | | |
|---|---|---|---|
| 0312252 | 4/1989 | European Pat. Off. . | |
| 2666094 | 8/1990 | France | 435/285 |

Primary Examiner—William H. Beisner
Attorney, Agent, or Firm—Bliss McGlynn

[57] ABSTRACT

An apparatus for conducting hybridization processes which includes a sealable vessel having a first longitudinal axis, a rotatable membrane support disposed inside the sealable vessel for supporting a membrane and having a second longitudinal axis, and a structure for rotating the membrane support about the second longitudinal axis. The membrane support is positioned in the sealable vessel so that the second longitudinal axis is offset relative to the first longitudinal axis such that a portion of the membrane support is near the bottom of the sealable vessel. The membrane support further has an opening therein located so that, when fluid is present on the bottom of the sealable vessel, the fluid flows into the membrane support and wets the inside surface of the membrane support while it is being rotated.

20 Claims, 1 Drawing Sheet 5,427,948

APPARATUS FOR CONDUCTING HYBRIDIZATION

BACKGROUND OF THE INVENTION

1. Field of the Invention

The present invention relates generally to apparatuses for conducting micro-biological experiments, and, more particularly, to apparatuses for conducting hybridization processes.

2. Description of the Related Art

DNA fragments are used in hybridization reactions to characterize the identity of specific genes and to study the molecular organization of genomic sequences. Specific hybridization techniques have been developed in the past, namely, the Southern hybridization process, the Northern hybridization process, and the Western hybridization process.

In the Southern hybridization process, single-stranded DNA fragments are bound to a membrane and the bound DNA fragments are then hybridized by exposure to a hybridization solution containing radioactive materials. The single-stranded DNA fragments bound to the membrane that are complementary to the radioactive material will form hybrids. The membranes are then washed and ready for analysis.

Past procedures for conducting the Southern hybridization process have involved tedious washing steps and potential human exposure to radioactive materials.

SUMMARY OF THE INVENTION

It is, therefore, one object of the present invention to provide an apparatus for conducting hybridization processes which simplifies the washing step.

It is another object of the present invention to provide an apparatus for conducting hybridization processes which uses a minimum amount of hybridization solution.

It is yet another object of the present invention to provide an apparatus for conducting hybridization processes which reduces human exposure to radioactive materials.

To achieve the foregoing objects, the present invention is an apparatus for conducting hybridization which includes a sealable vessel having a first longitudinal axis, a rotatable membrane support disposed inside the sealable vessel for supporting a membrane and having a second longitudinal axis, and means for rotating the membrane support about the second longitudinal axis. The membrane support is positioned in the sealable vessel so that the second longitudinal axis is offset relative to the first longitudinal axis such that a portion of the membrane support is near the bottom of the sealable vessel. The membrane support further has an opening therein located so that, when fluid is present on the bottom of the sealable vessel, the fluid flows into the membrane support and wets the inside surface of the membrane support while it is being rotated.

One advantage of the present invention is that an apparatus is provided for conducting hybridization processes. Another advantage of the present invention is that the hybridization apparatus provided simplifies the washing step of the hybridization process so that the washing step is faster, easier, and less labor intensive. Another advantage of the present invention is that the hybridization apparatus uses a minimum amount of hybridization solution. Yet another advantage of the present invention is that the hybridization apparatus minimizes human exposure to radioactive materials.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
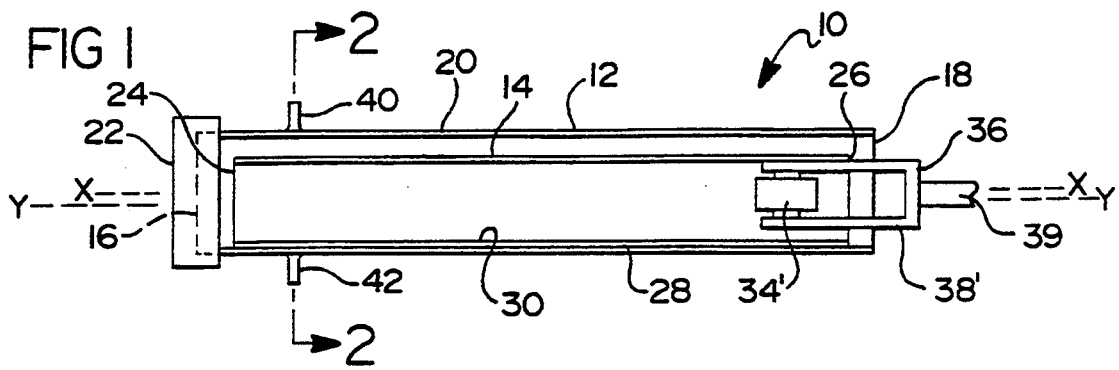
FIG. 1 is a side elevational view of an apparatus for conducting hybridization processes according to the present invention.

Referring to FIG. 1, an apparatus 10 for conducting hybridization processes is shown. Apparatus 10 includes sealable vessel 12 and membrane support 14 disposed inside and resting on the bottom of sealable vessel 12. Sealable vessel 12 and membrane support 14 may be formed of glass or plastic or other material suitable for hybridization techniques. Although sealable vessel 12 is shown as being cylindrically-shaped, other suitable shapes may be used in the invention. Sealable vessel 12 has open front end 16, closed back end 18, cylindrical wall 20 connecting front end 16 and back end 18, and longitudinal axis X—X which extends from the center of front end 16 to the center of back end 18. Sealable vessel 12 also has cap 22 closing front end 16. Cap 22 may be, e.g., a screw cap or a press fit cap. Preferably, cap 22 includes sealing means (not shown), such as a gasket, to provide optimum sealing. Open front end 16 and cap 22 allows the opening of sealable vessel 12 so that membrane support 14 may be placed therein.

Membrane support 14 has open front end 24, open back end 26, and continuous cylindrical wall 28 connecting front end 24 and back end 26. Cylindrical wall 28 has inside surface 30, best seen in FIG. 2, for supporting a membrane (not shown). Typically, during the hybridization process, a rectangular membrane (not shown), formed of, e.g., nitrocellulose or a nylon derivative, is rolled into a tubular shape and placed inside membrane support 14 so that it lays against inside surface 30. It is preferred that cylindrical wall 28 be substantially continuous to provide maximum support for such a membrane.

Membrane support 14 is positioned in sealable vessel 12 so that a portion of cylindrical wall 28 is near the bottom of sealable vessel 12. To accomplish this, membrane support 14 rests on the bottom of sealable vessel 12. Alternatively, membrane support 14 may be secured by any suitable means to maintain a position near the bottom of sealable vessel 12.

Membrane support 14 is rotatable about longitudinal axis Y—Y which extends from the center of front end 24 to the center of back end 26. In addition, membrane support 14 has an outer diameter which is smaller than the inner diameter of sealable vessel 12, which minimizes frictional contact between membrane support 14 and sealable vessel 12 during rotation of membrane support 14. Since membrane support 14 has an outer diameter which is smaller than the inner diameter of sealable vessel 12 and membrane support 14 rests on the bottom of the inside surface of sealable vessel 12, longitudinal axis Y—Y of membrane support 14 is offset from and below longitudinal axis X—X of sealable vessel 12.

Figure 2:
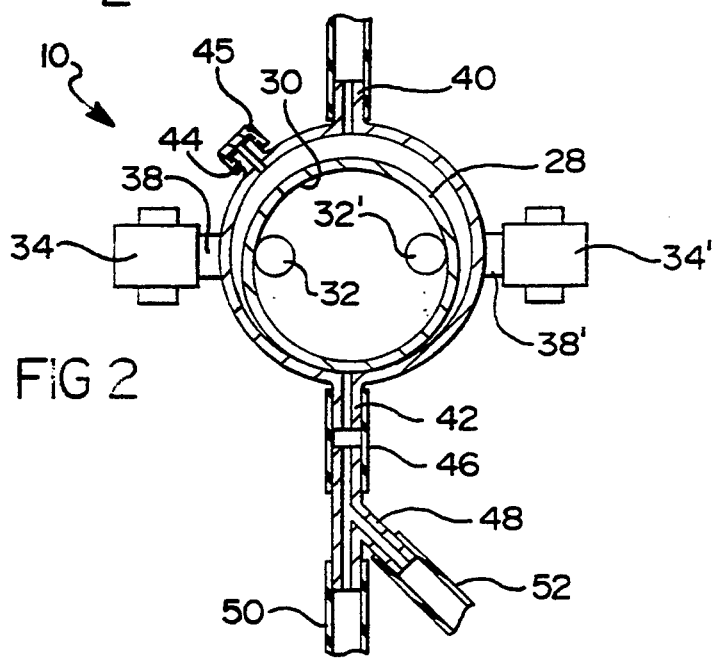
FIG. 2 is a sectional view taken along line 2—2 of FIG. 1.

As illustrated in FIGS. 1 and 2, apparatus 10 includes first magnets 32 and 32' attached to inside surface 30 of membrane support 14 which are moved by second magnets 34 and 34', respectively, outside sealable vessel 12. Magnets 32 and 32' are attached near back end 26 of membrane support 14 and are positioned 180° apart along the same radius of membrane support 14. It is preferred that the inside surface of membrane support 14 be large enough so that a membrane as described above may be placed on the smooth inner surface without contacting a magnet. Laying the entire membrane against inner surface 30 avoids the formation of air bubbles on the membrane surface which would lead to non-uniform hybridization. Magnets 32 and 32' may be attached to inside surface 30 by any suitable means, such as by adhesive or screws.

Magnets 34 and 34' are positioned outside sealable vessel 12 and near magnets 32 and 32', respectively. Therefore, magnets 34 and 34' are spaced 180° apart and are axially and radially in line with magnets 32 and 32'. Magnets 34 and 34' are held by retainer 36 which has arms 38 and 38', to which magnets 34 and 34' are attached, respectively. Retainer 36 is connected to drive shaft 39 which is rotatable by a motor (not shown). The rotation of drive shaft 40 causes retainer 36 to rotate which, in turn, causes magnets 34 and 34' to rotate about the circumference of sealable vessel 12. The rotation of magnets 34 and 34' causes the rotation of magnets 32 and 32', thereby causing the rotation of membrane support 14. It should be appreciated that, although other means for rotating membrane support 14 may be used, the magnets described herein are desirable as they present minimal parts which could lead to leakage problems.

In an alternative embodiment, a single magnet may be attached to membrane support 14 which is rotated by a single magnet which rotates about the circumference of sealable vessel 12. As another variation of the invention, sets of more than two magnets may be employed. As another way of rotating membrane support 14, membrane support 14 may be attached to a drive shaft which is rotated by a motor.

Sealable vessel 12 further has vent port 40 near the top of the vessel, conduit port 42 near the bottom of the vessel, and insertion port 44 on the upper portion of the vessel. Vent port 40 provides fluid communication between the outside of sealable vessel 12 and the inside of sealable vessel 12 and is present to allow air to vent from the vessel when adding fluid to sealable vessel 12 and to allow air to enter the vessel when removing fluid from sealable vessel 12. Insertion port 44 has screw top 45 thereon and is present to provide access into sealable vessel 12 for addition of hybridization solution and the like without having to remove cap 22 from sealable vessel 12.

Figure 3:
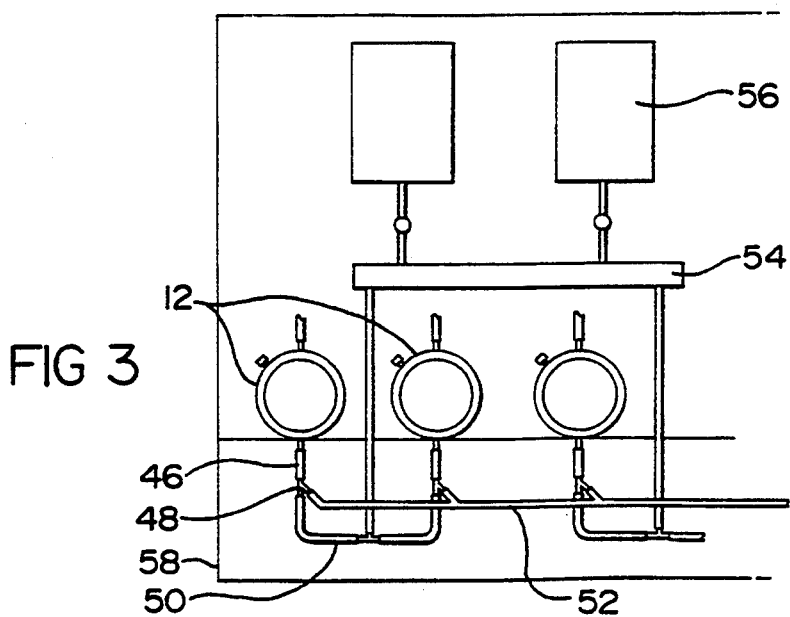
FIG. 3 is a front elevational view of a series of apparatuses of FIG. 1 illustrated in operational relationship with an incubator.

Conduit port 42 is present to provide fluid communication between the outside of sealable vessel 12 and the inside of sealable vessel 12. Conduit 46 is shown attached to sealable vessel 12 in FIGS. 2 and 3. A valve may be installed in conduit 46 to control fluid flow into and out of sealable vessel 12. Also shown in FIG. 3 are several sealable vessels 12 placed in parallel so that several hybridization reactions can take place at one time. Each sealable vessel 12 can have a different type of membrane, allowing for the testing of several membranes at a time. "Y" connector 48, connected to conduit 46, provides means for attaching conduits 50 and 52 to conduit 46. Conduit 50 is connected to manifold 54 which is, in turn, fluidly connected to fluid source 56 which may contain, e.g., hybridization solution or wash solution. Conduit 52 may lead to a waste container (not shown) into which fluid from sealable vessel 12 may drain.

The sealable vessels 12 shown in FIG. 3 are placed in incubator 58 which maintains the temperatures of the vessels and their contents at the desired temperature.

During operation of apparatus 10, first a DNA-bound membrane is rolled into tubular form and placed inside membrane support 14. Membrane support 14 is then placed inside sealable vessel 12, and cap 22 is secured onto sealable vessel 12. Hybridization solution is then added into sealable vessel 12 through either insertion port 44 or through conduit 46. Typically, hybridization solution is added to fill less than about ⅛ the volume of sealable vessel 12. Hybridization solution enters membrane support 14 through open front and back ends 24 and 26 and wets inside surface 30 of membrane support 14, thereby wetting the membrane therein.

Membrane support 14 is then caused to rotate by rotating magnets 34 and 34' around the circumference of sealable vessel 12. The rotation of membrane support 14 causes the continuous wetting of the entire inside surface 30 and of the entire membrane. The rotation of membrane support 14 and its proximity to the bottom of sealable vessel 12 allows the reaction to take place with a minimum amount of hybridization fluid.

Open ends 24 and 26 of membrane support 14 allow the fluid to enter the membrane support. Alternatively, only one open end or openings in other locations on membrane support 14 would serve the same purpose.

The hybridization reaction is allowed to occur for the desired length of time in the incubator. Once the hybridization is completed to the extent desired, the spent hybridization solution is drained from sealable vessel 12 through conduit 52 and into a waste container. The membranes are then washed by filling the sealable vessels with wash solution to any desired level. Preferably, the wash solution is from fluid source 56. From fluid source 56, the wash solution flows through manifold 54, through conduit 50, through "Y" connector 48, through conduit 46, and into sealable vessel 12. Membrane support 14 is rotated to assist in the washing process. Used wash solution may be drained from sealable vessel 12 and into a waste container. The washing procedure may be repeated as desired. After washing, the membranes may be removed from the apparatus and analyzed, as desired. It can be seen that, using apparatus 10 of the present invention, the washing of the membranes is accomplished without handling the membranes or any radioactive materials.

Accordingly, apparatus 10 of the present invention is useful for hybridization processes, such as Southern, Northern and Western hybridization techniques. Apparatus 10 used for conducting hybridization processes simplifies the washing step, uses a minimum amount of hybridization solution, and reduces human exposure to radioactive materials.

The present invention has been described in an illustrative manner. It is to be understood that the terminology which has been used is intended to be in the nature of words of description rather than of limitation.

Many modifications and variations of the present invention are possible in light of the above teachings.

Therefore, within the scope of the appended claims, the present invention may be practiced otherwise than as specifically described.

What is claimed is:

1. An apparatus for conducting hybridization processes, comprising:
   (a) a cylindrically-shaped sealable vessel having a first longitudinal axis;
   (b) a cylindrically-shaped rotatable membrane support disposed inside said sealable vessel for supporting a membrane and having a second longitudinal axis, said membrane support having a front end and a back end and a cylindrical wall connecting said front end and said back end, said cylindrical wall having an inside surface for supporting the membrane longitudinally therealong in continuous contact with said inside surface, said membrane support being positioned in said sealable vessel so that the second longitudinal axis is offset relative to the first longitudinal axis such that a portion of said membrane support is near the bottom of said sealable vessel, said membrane support having an opening therein located so that, when fluid is present on the bottom of said sealable vessel, the fluid flows into said membrane support and wets the inside surface of said membrane support while it is being rotated; and
   (c) means for rotating said membrane support about the second longitudinal axis.

2. An apparatus as set forth in claim 1, further comprising a conduit port attached to the sealable vessel providing fluid communication between the outside of the sealable vessel and the inside of the sealable vessel.

3. An apparatus as set forth in claim 1, further comprising a vent port near the top of the sealable vessel providing fluid communication between the outside of the sealable vessel and the inside of the sealable vessel.

4. An apparatus as set forth in claim 1, wherein the sealable vessel has a front end and a back end and a wall connecting the front and back ends.

5. An apparatus as set forth in claim 1, further comprising means for opening the sealable vessel so that the membrane support may be placed therein.

6. An apparatus as set forth in claim 1, wherein the membrane support rests on the bottom of the sealable vessel.

7. An apparatus as set forth in claim 1, wherein the means for rotating the membrane support comprises a first magnet attached to the membrane support, a second magnet axially in line with the first magnet and outside the sealable vessel, and means for rotating the second magnet around the circumference of the sealable vessel to thereby rotate the first magnet about the second longitudinal axis.

8. An apparatus as set forth in claim 1, wherein said cylindrical wall of said membrane support is continuous.

9. An apparatus as set forth in claim 1, wherein the ends of said membrane support are open ends.

10. An apparatus for conducting hybridization processes, comprising:
    (a) a cylindrically-shaped sealable vessel having a front end and a back end and walls connecting said front and back ends and having a first longitudinal axis;
    (b) a cylindrically-shaped rotatable membrane support disposed inside said sealable vessel, said membrane support having an open front end and an open back end and a cylindrical wall connecting said open front and back ends, said cylindrical wall having an inside surface for supporting a membrane longitudinally therealong in continuous contact with said inside surface, said membrane support having a second longitudinal axis, the second longitudinal axis offset relative to the first longitudinal axis such that said cylindrical wall rests on the bottom of said sealable vessel, said membrane support having said open front and back ends so that when fluid is present on the bottom of said sealable vessel, the fluid flows into said membrane support, and wets said inside surface of said membrane support while it is being rotated;
    (c) means for rotating said membrane support about the second longitudinal axis;
    (d) a conduit port near the bottom of said sealable vessel providing fluid communication between the outside of said sealable vessel and the inside of said sealable vessel;
    (e) a vent port near the top of said sealable vessel providing fluid communication between the inside of said sealable vessel and the outside of said sealable vessel; and
    (f) means for opening said sealable vessel so that said membrane support may be placed therein.

11. An apparatus as set forth in claim 10, wherein the cylindrical wall of the membrane support is continuous.

12. An apparatus as set forth in claim 10, wherein the means for rotating the membrane support comprises a first magnet attached to the cylindrical wall of the membrane support, a second magnet axially in line with the first magnet and outside the sealable vessel, and means for rotating the second magnet around the circumference of the sealable vessel to thereby rotate the first magnet about the second longitudinal axis.

13. An apparatus for conducting hybridization processes, comprising:
    (a) a cylindrically-shaped sealable vessel having a front end and a back end and walls connecting said front and back ends and having a first longitudinal axis;
    (b) a cylindrically-shaped rotatable membrane support inside said sealable vessel resting on the bottom thereof, said membrane support having an open front end and an open back end and a continuous cylindrical wall connecting said open front and back ends, said cylindrical wall having an inside surface for supporting a membrane longitudinally therealong in continuous contact with said inside surface, said membrane support having a second longitudinal axis offset relative to the first longitudinal axis and having said open front and back ends so that when fluid is present on the bottom of said sealable vessel, the fluid flows into said membrane support, and wets said inside surface of said membrane support while it is being rotated; and
    (c) a first magnet attached to said cylindrical wall of said membrane support, a second magnet axially in line with said first magnet and outside said sealable vessel, and means for rotating said second magnet around the circumference of said sealable vessel to thereby rotate said first magnet about the second longitudinal axis;
    (d) a conduit port near the bottom of said sealable vessel providing fluid communication between the outside of said sealable vessel and said inside of the sealable vessel;

(e) a vent port near the top of said sealable vessel providing fluid communication between the inside of said sealable vessel and the outside of said sealable vessel; and (f) means for opening said sealable vessel so that said membrane support may be placed therein.

14. An apparatus for conducting hybridization processes, comprising:

(a) a cylindrically-shaped sealable vessel;

(b) a cylindrically-shaped rotatable membrane support disposed inside said sealable vessel and having a continuous cylindrical wall having an inside surface for supporting a membrane longitudinally therealong in continuous contact with said inside surface and having a longitudinal axis, said membrane support being positioned in said sealable vessel so that said membrane support rests on the bottom of said sealable vessel, said membrane support having an opening therein located so that, when fluid is present on the bottom of said sealable vessel, the fluid flows into said membrane support and wets the inside surface of said membrane support while it is being rotated; and (c) means for rotating said membrane support about the longitudinal axis.

15. An apparatus as set forth in claim 14, further comprising a conduit port attached to the sealable vessel providing fluid communication between the outside of the sealable vessel and the inside of the sealable vessel.

16. An apparatus as set forth in claim 14, further comprising a vent port near the top of the sealable vessel providing fluid communication between the outside of the sealable vessel and the inside of the sealable vessel.

17. An apparatus as set forth in claim 14, wherein the sealable vessel has a front end and a back end and a wall connecting the front and back ends.

18. An apparatus as set forth in claim 14, further comprising means for opening the sealable vessel so that the membrane support may be placed therein.

19. An apparatus as set forth in claim 14, wherein the membrane support has an open end at each end of the cylindrical wall.

20. An apparatus as set forth in claim 14, wherein the means for rotating the membrane support comprises a first magnet attached to the cylindrical wall of the membrane support, a second magnet axially in line with the first magnet and outside the sealable vessel, and means for rotating the second magnet around the circumference of the sealable vessel to thereby rotate the first magnet about the longitudinal axis of the membrane support.

* * * * *